US010859197B2

(12) United States Patent
Reichinger

(10) Patent No.: US 10,859,197 B2
(45) Date of Patent: Dec. 8, 2020

(54) METHOD TO PRODUCE AN INSULATING PIPE SECTION FOR PIPEWORKS AND A PIPE SECTION

(71) Applicant: Rockwool International A/S, Hedehusene (DK)

(72) Inventor: Stephan-Ferdinand Reichinger, Essen (DE)

(73) Assignee: Rockwool International A/S, Hedehusene (DK)

( * ) Notice: Subject to any disclaimer, the term of this patent is extended or adjusted under 35 U.S.C. 154(b) by 111 days.

(21) Appl. No.: 16/094,067

(22) PCT Filed: Mar. 29, 2017

(86) PCT No.: PCT/EP2017/057442
§ 371 (c)(1),
(2) Date: Oct. 16, 2018

(87) PCT Pub. No.: WO2017/182246
PCT Pub. Date: Oct. 26, 2017

(65) Prior Publication Data
US 2020/0124225 A1    Apr. 23, 2020

(30) Foreign Application Priority Data
Apr. 18, 2016    (EP) .................................. 16165829

(51) Int. Cl.
*F16L 59/14*    (2006.01)
*F16L 59/02*    (2006.01)
(Continued)

(52) U.S. Cl.
CPC .......... *F16L 59/028* (2013.01); *F16L 59/026* (2013.01); *F16L 59/04* (2013.01); *F16L 59/08* (2013.01); *F16L 59/10* (2013.01); *F16L 59/14* (2013.01)

(58) Field of Classification Search
USPC ................................. 138/149, 156, 158, 172
See application file for complete search history.

(56) References Cited

U.S. PATENT DOCUMENTS 4,023,589 A * 5/1977 Rejeski ................... B29C 53/48
138/149
4,287,245 A * 9/1981 Kikuchi ................ F16L 59/024
138/141
(Continued)

FOREIGN PATENT DOCUMENTS

GB      2329688 A       3/1999
WO      WO-9701006 A1   1/1997
(Continued)

*Primary Examiner* — Patrick F Brinson
(74) *Attorney, Agent, or Firm* — Harness, Dickey & Pierce, P.L.C.

(57) ABSTRACT

A method for applying a flexible cladding material to an outer surface of an insulation layer for a pipe section includes providing the insulation layer in the shape of a cylinder and providing first and a second supporting elements with a gap therebetween. A layer of the flexible cladding material is arranged between the insulation layer and the first and second supporting elements. The insulation layer and the supporting elements are moved in relation to each other in such manner that the insulation layer and at least part of the layer of the flexible cladding material is moved through the gap between the first and the second supporting elements. The two supporting elements are moved toward one other after the insulation layer and the layer of flexible cladding material has passed through the gap. The flexible cladding material is adhesively connected to the insulation layer during or after the steps.

18 Claims, 7 Drawing Sheets

(51) Int. Cl.
*F16L 59/04* (2006.01)
*F16L 59/08* (2006.01)
*F16L 59/10* (2006.01)

(56) References Cited

U.S. PATENT DOCUMENTS

| | | | | |
|---|---|---|---|---|
| 4,307,756 A | * | 12/1981 | Voigt | F16L 59/04 |
| | | | | 138/149 |
| 5,947,158 A | * | 9/1999 | Gross | F16L 59/022 |
| | | | | 138/149 |
| 6,921,564 B1 | * | 7/2005 | Keenan | F16L 59/024 |
| | | | | 428/36.91 |
| 7,360,799 B1 | * | 4/2008 | Price | F16L 59/22 |
| | | | | 138/149 |
| 8,808,482 B2 | * | 8/2014 | Qi | B29C 65/02 |
| | | | | 156/188 |
| 2011/0197987 A1 | * | 8/2011 | Koravos | F16L 59/027 |
| | | | | 138/149 |
| 2011/0308659 A1 | * | 12/2011 | Oeschger | F16L 59/153 |
| | | | | 138/149 |
| 2020/0080681 A1 | * | 3/2020 | Fay | F16L 59/065 |

FOREIGN PATENT DOCUMENTS

| WO | WO-9748942 A1 | 12/1997 |
|---|---|---|
| WO | WO-2015144590 A1 | 10/2015 |

\* cited by examiner

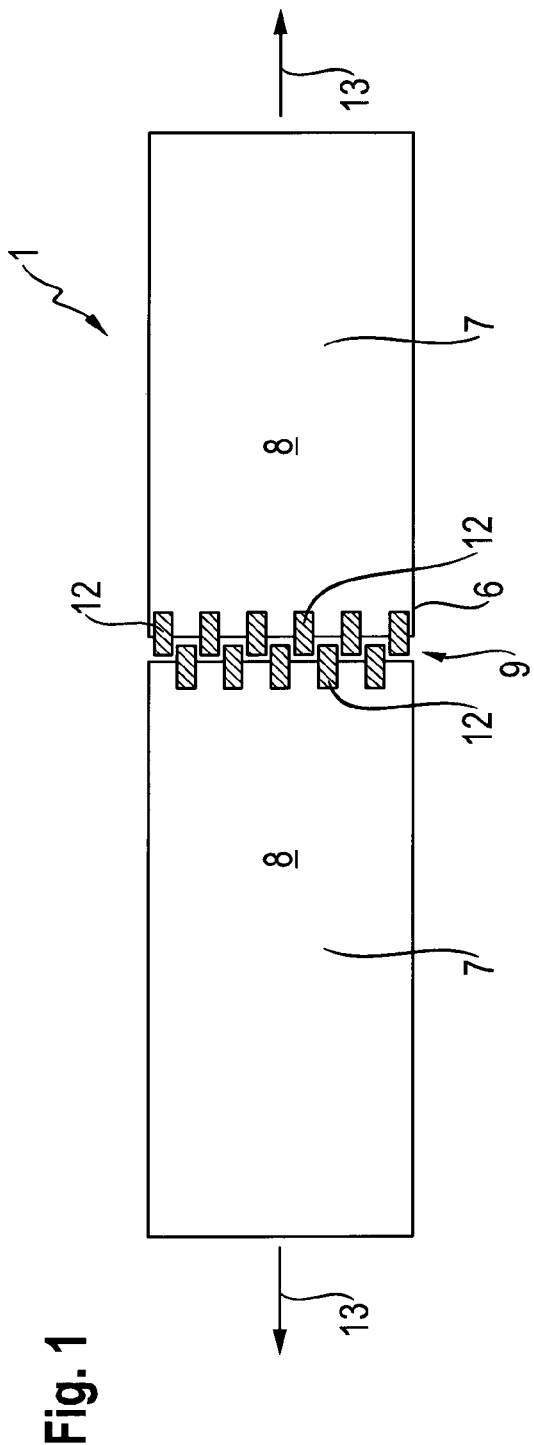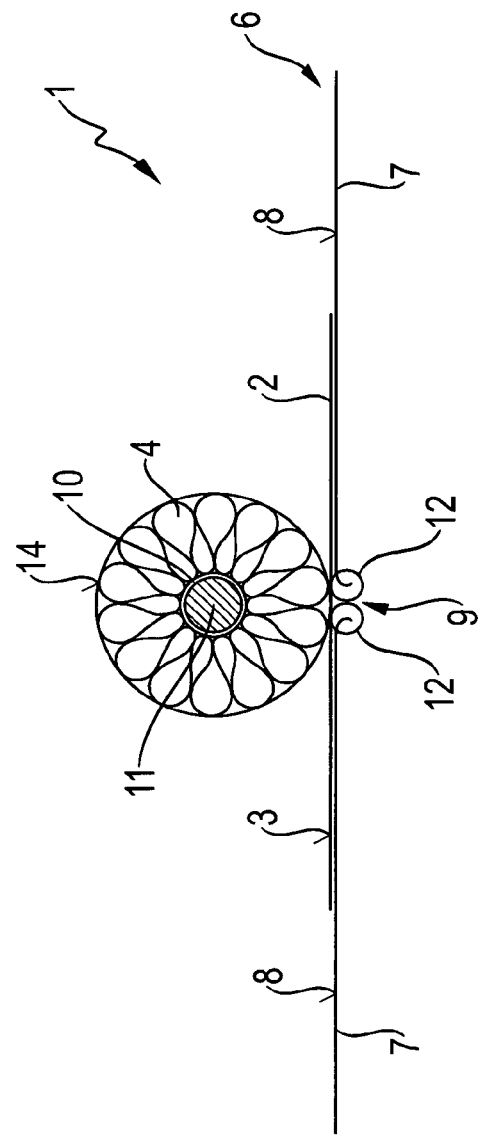

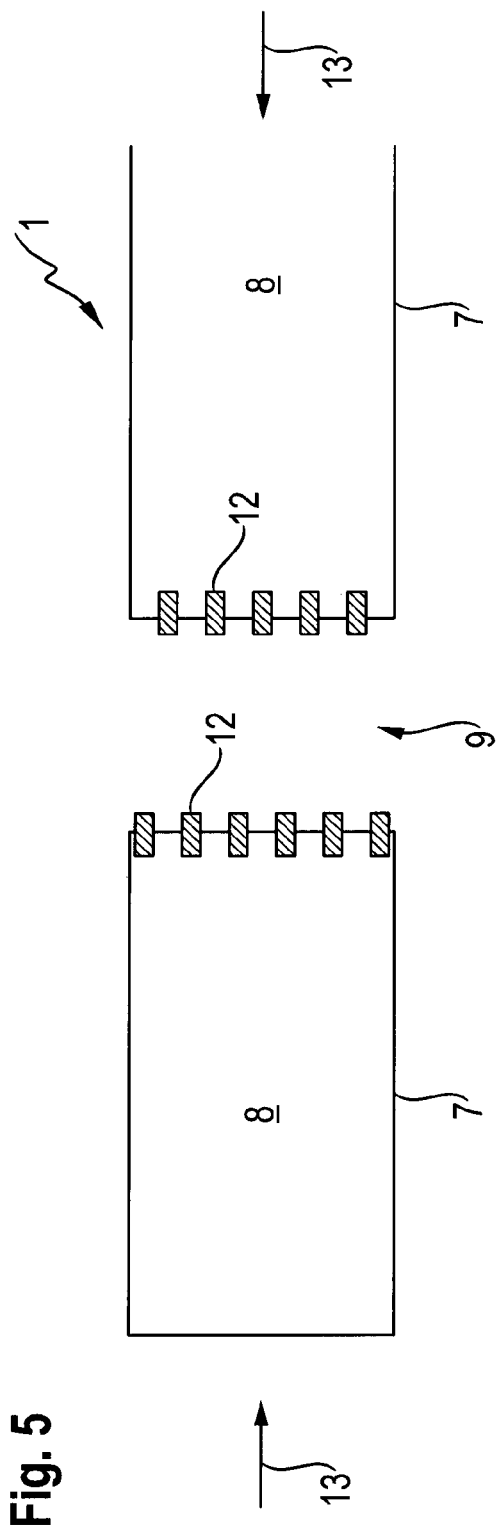
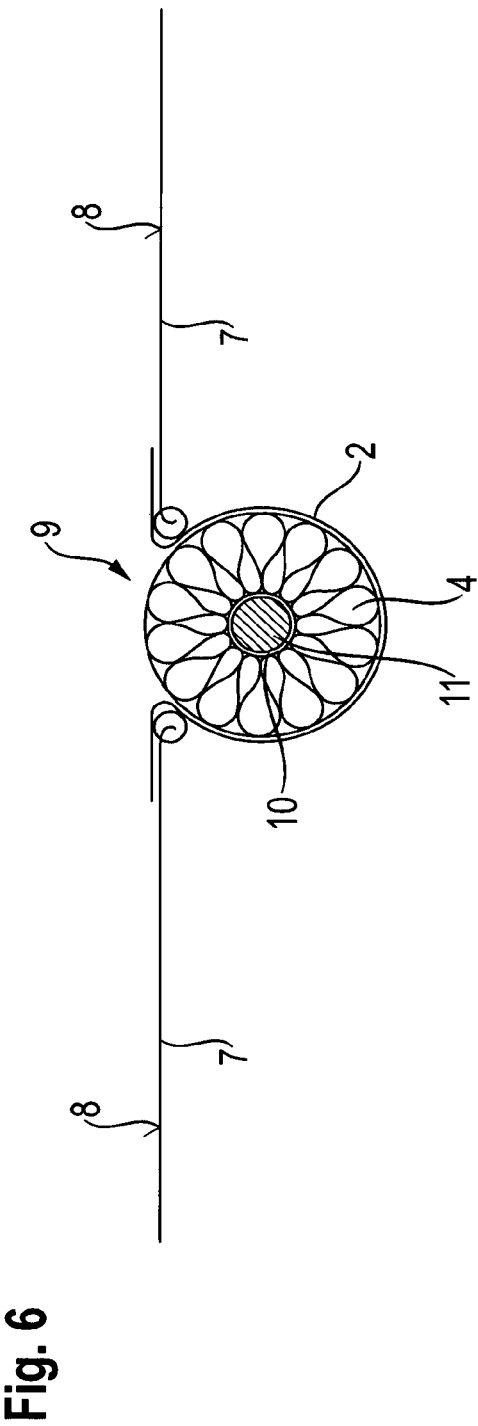

METHOD TO PRODUCE AN INSULATING PIPE SECTION FOR PIPEWORKS AND A PIPE SECTION

CROSS-REFERENCE TO RELATED APPLICATIONS

This application is a National Stage of International Application No. PCT/EP2017/057442, filed on Mar. 29, 2017. This application claims the priority to European Patent Application No. 16165829.9, filed on Apr. 18, 2016. The entire disclosures of the above applications are incorporated herein by reference.

FIELD

Main subject of the disclosure is a method to produce an insulating pipe section for pipeworks, especially for pipes with an outer diameter of more than 500 mm, consisting of an insulation layer, preferably made of mineral fibers and a binding agent, especially stone wool or glass wool, and an outer cladding, preferably made of a fiberglass reinforced polyester mat, an aluminium foil or the like. Furthermore, the disclosure relates to a pipe section especially with an outer diameter of more than 500 mm consisting of an insulation layer having an outer surface, preferably made of mineral fibers and a binding agent, especially stone wool or glass wool, and an outer cladding made of a fiberglass reinforced polyester mat, especially produced according to the method according to the disclosure.

BACKGROUND

This section provides background information related to the present disclosure which is not necessarily prior art.

It is well known to use insulation elements for pipework consisting of an insulation layer and an outer cladding. Furthermore, it is well known to use a water tight cladding made of a fiberglass reinforced polyester mat which initially is positioned between two sheets of film. The cladding contains resins, fiberglass and special fillers and is ready to use. Unprocessed it is soft and malleable. In this state the cladding can be cut or trimmed into any shape which makes it easy to apply to the insulation layer. The fiberglass reinforced polyester mat subsequently cures under the influence of ultraviolet (UV) light. After curing the cladding is absolutely watertight and is able to give optimal mechanical protection. The cladding made of a fiberglass reinforced polyester mat is with respect to the mechanical characteristics comparable to a cladding made of sheet metal.

According to the prior art in a first step a pipe section is produced by using an insulation layer, for example made of mineral fibers and a binding agent, which may be coated with an aluminium foil. After the insulation layer is applied to the pipework an outer cladding of a fiberglass reinforced polyester mat that is curable by UV light is applied. Before the fiberglass reinforced polyester mat is applied a first protective foil is removed therefrom and thereby exposes the partially sticky fiberglass reinforced polyester mat which is then applied to the outer surface of the pipe section on the pipework. A second protective foil is arranged on the outer surface of the fiberglass reinforced polyester mat. This second protective foil is open for UV-light, and the fiberglass reinforced polyester mat is now cured by being exposed to UV light e.g. from a natural UV-light (sun) or an artificial UV-light source. After curing the second (outer) protective foil is easily removed. The cured fiberglass reinforced polyester mat now provides an outer cladding of the pipe section. It is strong and hard and has the necessary mechanical strength to provide protection and is absolutely watertight.

GB 2 329 688 A discloses another method for protecting insulated pipework which comprises mounting around the insulated pipework a weather proofing sheet, wherein the weather proofing sheet is mounted to the pipework directly or indirectly as a jacket which is wrapped around the circumference of the insulated pipework and overlapped and bonded to itself as the primary means of securing the weather proofing sheet to the insulated pipework. It is common to apply a sheet of insulation foam around the pipework and to then coat the external surface of the foam with an adhesive to which an outer weather proofing sheet is then applied to enwrap the insulated pipework. According to the above-mentioned document a weather proofing non-metallic, soft and stretchable sheet material for cladding the insulated pipework is provided. A first piece that is sufficient to wrap around the circumference of a selected length of the insulated pipework completely is cut from the sheet material providing an overlapping edge and afterwards the piece of sheet material is mounted around the selected length of insulated pipework and an adhesive is applied substantially only to one or both of the overlapping edges to bond them together in order to hold the sheet material on the insulated pipework.

This well known method has the disadvantage that in practice it is not applicable to pipework with larger diameters, e.g. of more than 500 mm. Furthermore, this method has the disadvantage that it is not applicable with a hardenable outer cladding such as fiberglass reinforced polyester. The well known method can only be applied in situ which means that insulation elements for pipe sections cannot be prefabricated especially not for pipework with larger diameters.

Furthermore it is of disadvantage to use a cladding of sheet metal, since it is meanwhile common to remove and steal the sheet metal, as sheet metal can be easily sold as a high priced product.

SUMMARY

This section provides a general summary of the disclosure, and is not a comprehensive disclosure of its full scope or all of its features.

It is one object of the disclosure to provide a method to produce a pipe section with an insulation element and a hardened cladding for pipework resulting in a prefabricated pipe section even for pipework with larger diameters which can easily be handled and installed and which avoids damages due to not allowed removing or stealing of the cladding.

This object is achieved by a method for applying a flexible cladding material to an outer surface of an insulation layer for a pipe section comprising the steps of providing the insulation layer in the shape of a cylinder having a cylindrical central opening, providing a first and a second supporting element defining a gap between the first and second supporting element, of which at least the first element is movable towards and away from the second supporting element between a first position in which the two supporting elements are close to each other, thereby nearly closing the gap and a second position in which the supporting elements are at a distance from each other, thereby defining the gap being larger than the gap in the first position, arranging a layer of the flexible cladding material between the insulation layer and the two supporting elements in such manner that an adhesive surface of the layer of the flexible cladding material is facing towards the insulation layer, or in such a manner that an adhesive surface of the insulation layer is facing towards the layer of flexible cladding material, moving the insulation layer and the supporting elements in relation to each other in such manner that the insulation layer and at least a part of the layer of the flexible cladding material is moved through the gap between the first and the second supporting element, whereby the two support elements are moved towards each other after the insulation layer and the layer of the flexible cladding material with its major diameter has passed through the gap between the first and the second supporting element and wherein the layer of the flexible cladding material is adhesively connected to the insulation layer during or after the mentioned process steps.

According to a first embodiment of the method according to the disclosure the layer of the flexible cladding material is arranged on a carrier having two supporting elements being relatively moveable in a horizontal plane to each other whereby the insulation layer is arranged on the layer of the flexible cladding material above the gap between the two supporting elements of the carrier, whereby at least one of the two supporting elements of the carrier is moved from the first position into the second position, thereby widening the gap, whereby the insulation layer together with the layer of the flexible cladding material is lowered into an area at least partly below the carrier, whereby at least one of the two supporting elements of the carrier is moved from the second position to the first position thereby bringing two areas of the layer of the flexible cladding material surrounding the insulation layer into an adjacent position to each other and whereby the two areas of the layer of the flexible cladding material are connected to each other.

According to a second embodiment of the method according to the disclosure the layer of the flexible cladding material is arranged on a carrier having the two supporting elements being relatively movable in a horizontal plane to each other, whereby the insulation layer is arranged on the layer of the flexible cladding material above the gap between the two supporting elements of the carrier, whereby the insulation layer together with the layer of the flexible cladding material is lowered through the gap into an area at least partly below the carrier, whereby at least one of the two supporting elements of the carrier is moved, thereby closing the gap and bringing two areas of the layer of the flexible cladding material into an adjacent position to each other, surrounding the insulation layer and whereby two areas of the layer of the flexible cladding material are connected to each other.

The disclosure proposes especially two possible embodiments to produce an insulating pipe section. These embodiments differ in that according to the first embodiment the insulation element having a cylindrical shape with a central cylindrical opening is positioned on top of a carrier whereby the layer of the flexible cladding material is positioned between the insulation element and the surface of the carrier. The carrier consists of two supporting elements of which at least one is moveable relative to the other so that by opening a gap the insulation element in the cylindrical shape together with the layer of the flexible cladding material can be lowered downwards. The insulation element is thereby carried on the one hand by the layer of the flexible cladding material and on the other hand by a core being inserted into the central cylindrical opening and being part of a lifting system. After the insulation element is lowered about half of its diameter, the two supporting elements of the carrier are now positioned in the maximum distance to each other and the supporting elements are moved in reverse direction closing the gap again whereby the insulation element is lowered further until the two supporting elements of the carrier can reach their closed position above the insulation element thereby bringing the two ends of the layer of the flexible cladding material into close contact to each other which does not mean that the two ends of the layer of the flexible cladding material are overlapping. In this position the two ends of the layer of the flexible cladding material facing to each other are fixed to each other before the insulation element with the adhesively connected layer of the flexible cladding material forming an insulating pipe section is removed from the area of the carrier.

According to the second embodiment of the disclosure the carrier having two supporting elements being relatively moveable to each other parallel to the layer of the flexible cladding material is in its open position which means that the two supporting elements of the carrier are arranged in a maximum distance from each other and the layer of the flexible cladding material spans across the gap between the two supporting elements of the carrier. Now, the insulation layer having a cylindrical shape with a central cylindrical opening is arranged on top of the layer of the flexible cladding material and lowered together with the layer of the flexible cladding material thereby reaching a position in which the insulation layer is arranged with its middle radial axis between the two supporting elements of the carrier. While lowering the insulation layer further at least one supporting element of the carrier is moved into the direction of the second supporting element thereby closing the gap between the two supporting elements and moving the layer of the flexible cladding material into the direction of the outer surface of the insulation layer. Finally, this second embodiment of the disclosure follows the first embodiment by bringing two areas of the layer of the flexible cladding material in close contact to each other and connecting the two areas of the layer of the flexible cladding material to each other before the insulating pipe section made of the insulation layer with the adhesively connected layer of the flexible cladding material is removed from the area of the carrier.

Although the method according to the disclosure is described in details with respect to the two embodiments the scope of disclosure is not limited to these embodiments. The basic principle of the disclosure is to move the insulation layer especially as a cylinder having a cylindrical central opening together with the adhesive layer of the flexible cladding material through the gap provided by two supporting elements which are used to bring the layer of the flexible cladding material into contact with the insulation layer in a the insulation layer surrounding manner before the layer of the flexible cladding material is attached and fixed to the insulation layer. The supporting elements are moved relatively to each other so that one supporting element can be an element in a fixed position. The method according to the disclosure does not depend on the direction of the movement of the insulation layer together with the layer of the flexible cladding material relative to the supporting elements. It is possible that the insulation layer together with the layer of the flexible cladding material is moved and the device containing the supporting elements is fixed or the supporting elements are moved and the insulation layer together with the layer of the flexible cladding material is in a fixed position and even that the supporting elements and the insulation layer together with the layer of the flexible cladding material are moved in an opposite direction to each other.

A big advantage of the before described method is that insulating pipe sections of larger diameters can be produced as prefabricated insulating pipe sections. These prefabricated pipe sections can be for example used for pipework having diameters of more than 500 mm. The prefabricated pipe sections can be wrapped into a foil which is removed before applying the pipe section at the pipework. Applying the insulating pipe section at the pipework can be done very easily and in short time before the layer of the flexible cladding material is cured. Nevertheless, preferably the layer of the flexible cladding material is cured already before bringing the insulating pipe section to the pipework which means that it is cured in the production area of the pipe section.

According to another aspect of the disclosure at least one surface of the layer of the flexible cladding material is provided with a covering that is removed to expose an adhesive surface before positioning the insulation layer on the adhesive surface of the layer of the flexible cladding material. This further step has the advantage that the insulation layer is fixed to the layer of the flexible cladding material while lowering the insulation layer together with the layer of the flexible cladding material. If the flexible cladding material is an uncured fiberglass reinforced polyester mat a second covering on the opposite and therefore second surface of the layer of the flexible cladding material is used to protect the layer of the flexible cladding material against mechanical influence and to ease handling thereof while being processed. The second covering can be removed before or after the layer of the flexible cladding material has been cured, e.g. by UV light. The curing of the layer of the flexible cladding material can be done in situ or in a curing device after removing the pipe section from the area of the carrier.

It is of advantage to connect the two areas of the layer of the flexible cladding material to each other by using at least one adhesive tape. The adhesive tape can be fixed with one end to the one end of the layer of the flexible cladding material and with the second end to the second end of the layer of the flexible cladding material thereby spanning over the connecting area of the two ends of the layer of the flexible cladding material. One or more stripes of adhesive tape can be used depending on the axial length of the pipe section.

As already mentioned the layer of the flexible cladding material can be cured in a curing station by using at least one light source emitting UV-light. Curing the layer of the flexible cladding material in such a curing station has the advantage that a definite curing can be achieved which is not dependable on the skill of someone applying the pipe section to the pipework. A prefabricated pipe section is delivered and has only to be fixed to the pipework and after fixation a gap between two ends of the pipe section being a slit through the insulation layer and the layer of the flexible cladding material has to be closed for example by using a strip of a fiberglass reinforced polyester mat which can be cured in situ by using natural or artificial UV light. The gap may also be closed by other means, for example by a tape or an adhesive strip of e.g. polyisobutylene. The pipe section may be fixed around the pipe by using metal bands or straps that extend circumferentially around the mounted pipe section. The width of such metal bands or straps may be 10-20 mm.

Another aspect of the disclosure is that a core is inserted into the central cylindrical opening of the insulation layer before positioning the insulation layer on the carrier. This core has the advantage that the movement of the insulation layer together with the layer of the flexible cladding material is controlled and can be done with a velocity which prohibits damages of the layer of the flexible cladding material and which is coordinated with the movement of the two supporting elements of the carrier in such manner that the layer of the flexible cladding material is pressed towards the outer surface of the insulation layer.

According to a further feature of the disclosure the insulation layer is turned around its middle axis before connecting two areas of the layer of the flexible cladding material being adjacent to each other. This method step makes it easier to connect the two ends of the outer cladding via adhesive tapes because the insulation layer together with the layer of the flexible cladding material can be moved into a position where the adhesive tape is applied to the outer surface of the layer of the flexible cladding material.

According to another feature of the disclosure both supporting elements of the carrier are moved simultaneously and equally which has the advantage that the insulation layer and the layer of the flexible cladding material can be moved together in a strict linear, especially vertical direction which makes it easier to control the movement of the insulation layer.

According to another feature of the method according to the disclosure the insulation layer is interrupted by a slit being arranged radially forming two ends of the pipe section being arranged adjacent to each other and in that the layer of the flexible cladding material is fixed to the insulation layer leaving one end of the insulation layer free of and therefore not covered by the layer of the flexible cladding material. In connection with that it is of advantage to elastify or soften the insulation layer in the area of the one end not covered by the layer of the flexible cladding material. This embodiment has the advantage that applying the pipe section to the pipework is easier as the pipe section can be opened to a certain degree and be imposed on the pipework and because of the elastified/softened area of the insulation layer the pipe section can be fixed to the pipework in a very tight manner so that any irregularities in the outer surface of the pipework can be compensated because of the flexibility of the insulation layer.

With respect to the pipe section for heat insulation being main subject of the disclosure the before mentioned object is solved by the layer of the flexible cladding material having a circumferential length being exactly a circumferential length of the outer surface of or maximum 5% shorter of the circumferential length of the outer surface of the insulation layer which is directly fixed on an outer surface of the insulation layer. This pipe section has the advantage that it only consists of two elements namely the insulation layer and the layer of the flexible cladding material which elements are connected to each other. Therefore, it is very easy to prefabricate such a pipe section just by using the layer of the flexible cladding material having a circumferential length being not longer than the circumferential length of the outer surface of the insulation layer and in that the layer of the flexible cladding material is fixed to the outer surface of the insulation layer in a direct way.

For this purpose the layer of the flexible cladding material can be fixed to the outer surface of the insulation layer via an adhesive being part of the layer of the flexible cladding material and being preferably enforceable by heat and/or light, especially UV-light. Instead of using the material itself as adhesive an outer surface of the layer of the flexible cladding material can be applied with a separate adhesive.

It is possible to use an adhesive which is enforceable by heat so that in a first step the layer of the flexible cladding material is applied to the insulation layer before the adhesive is activated, especially enforced to have its adhesive character. On the other hand it is possible to use a layer of the flexible cladding material having an adhesive being enforceable by UV-light as the use of a layer of the flexible cladding material made of a fiberglass reinforced polyester mat needs UV-light which finally fixes the layer of the flexible cladding material in its shape wound around the insulation layer.

To protect the outer surface of the layer of the flexible cladding material against a curing process at a time curing would be of disadvantage it is a further feature of the pipe section to provide a covering which covers the outer surface of the pipe section, namely of the layer of the flexible cladding material being not penetrable for UV-light having the advantage that the insulation element can even be put in shape after applying it to the pipework and before using UV-light, which can be natural sunlight or artificial UV-light to fix the pipe section in the predetermined shape. Often, however, the flexible cladding material is provided with a covering that is penetrable for UV-light such that curing by UV-light can take place through the covering. This has the advantage that the flexible cladding material is well protected until after being cured. In practice, the flexible cladding material loses its sticky characteristics after curing, so the covering after curing is loose and can easily be removed.

According to a further embodiment of the disclosure the insulation layer has an outer cylindrical diameter between 500 mm and 1200 mm so that a pipe section with this insulation layer can be easily used for pipework of larger diameter to which according to the prior art several parts of insulation elements had to be fixed to form a full coverage. With the pipe section according to the disclosure it is possible to use only one element to surround the whole pipework of large diameter.

According to a further embodiment of the disclosure the insulation layer is interrupted by a slit arranged radially forming two ends of the insulation layer being arranged adjacent to each other and the layer of the flexible cladding material is fixed to the insulation layer leaving one end of the insulation layer free of and therefore not covered by the layer of the flexible cladding material. The part of the insulation layer being not covered by the layer of the flexible cladding material has a high elasticity or softness so that the pipe section can be applied to the pipework in a tight fit manner as to leave no gaps between the insulation layer and the pipework.

DRAWINGS

The drawings described herein are for illustrative purposes only of selected embodiments and not all possible implementations, and are not intended to limit the scope of the present disclosure.

Further features and embodiments of the disclosure are described in the following with respect to the drawings showing preferred embodiments of the disclosure, wherein:

FIG. 1 shows a device for processing the method according the disclosure in a first position in a top view;

FIG. 2 shows the device according to FIG. 1 with an insulation layer and a flexible cladding material in a side view;

FIG. 5 shows the device according to FIG. 1 in a third position in a top view;

FIG. 6 shows the device according to FIG. 5 with an insulation layer and a flexible cladding material in a side view;

Corresponding reference numerals indicate corresponding parts throughout the several views of the drawings.

DETAILED DESCRIPTION

Figure 3:
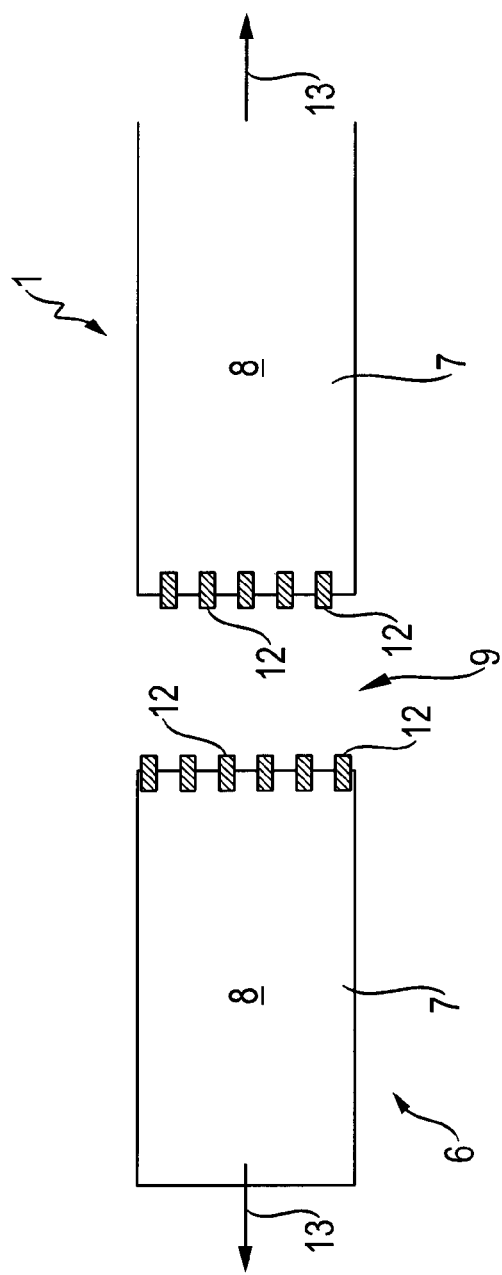
FIG. 3 shows the device according to FIG. 1 in a second position in a top view.

Example embodiments will now be described more fully with reference to the accompanying drawings.

FIGS. 1 to 8 show a device 1 for processing a method for applying a layer 2 of flexible cladding material having an outer surface 3 to an insulation layer 4 for a pipe section 5. The device contains a carrier 6 having two supporting elements 7 being relatively movable simultaneously and equally in a horizontal plane to each other. The carrier 6 has an upper surface 8 on which the layer 2 of the flexible cladding material is disposed thereby covering a gap 9 between the two supporting elements 7.

The length of the layer 2 of the flexible cladding material corresponds to the circumference of the insulation layer 4, which has the shape of a cylinder having a cylindrical central opening 10 into which a core 11 of a holding device (not shown) is inserted. The layer 2 of the flexible cladding material is disposed on the carrier 6 in a manner so that one half of the layer 2 of the flexible cladding material extends in each direction from the gap 9 in the lengthwise direction of the supporting elements 7. Therefore, starting from the gap 9, which is closed in FIG. 1 on each supporting element 7 a length of one half of the circumference of the insulation layer 4 is disposed.

The end of each supporting element 7 adjacent to the end of the opposite supporting element 7 is equipped with rollers 12 which are used to avoid damages like scratches in the surface of the layer 2 of flexible cladding material while the supporting elements 7 of the carrier 6 are moved in directions according to arrows 13 shown in FIG. 1. The rollers 12 are also used to press the layer 2 of flexible cladding material against an outer surface 14 of the insulation layer 4 during the process. The layer 2 of the flexible cladding material is in a preferred embodiment made of UV light curable fiberglass reinforced polyester. This material is flexible and can be cured or hardened by using UV light which can be natural sunlight or an artificial UV light source as used in a curing device (not shown).

The insulation layer 4 consists of inorganic fibers, especially stone wool fibers connected to each other by a binding agent which represents a small amount of the insulation layer 4 compared to the amount of fibers. The insulation layer can be produced from a mat which is wound around a mandrel or core 11 before the binding agent is cured in a curing device which ensures that the insulation layer 2 keeps its shape of a cylinder having a cylindrical central opening into which the core 11 can be inserted before the insulation layer 4 is applied to the layer 2 of the flexible cladding material.

Figure 4:
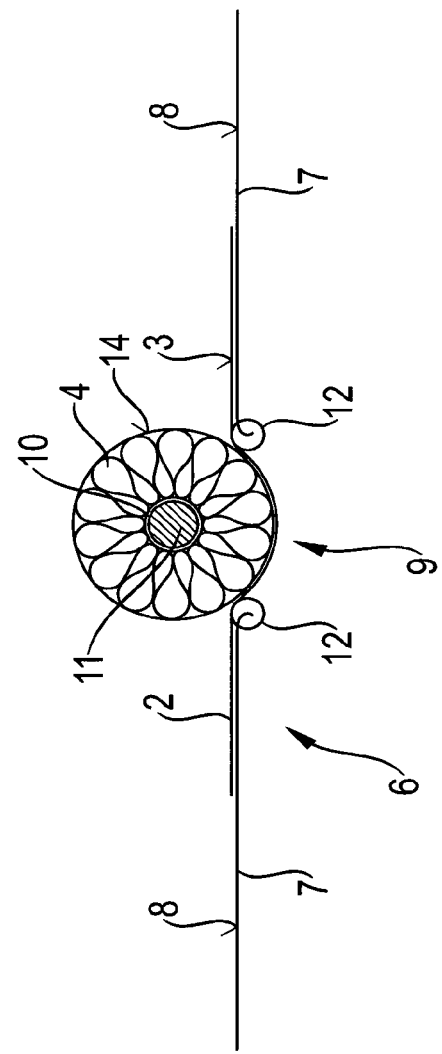
FIG. 4 shows the device according to FIG. 3 in a side view.
Figure 7:
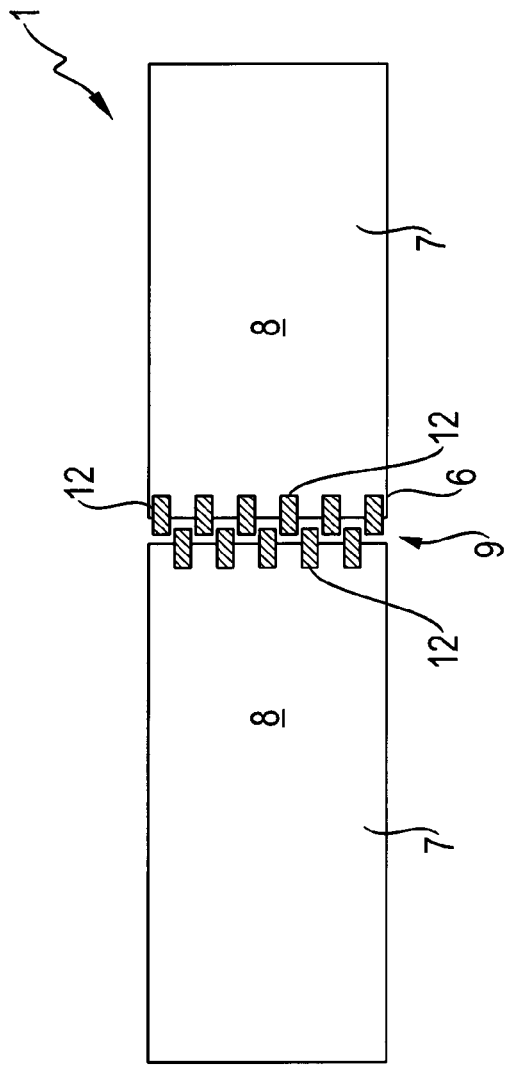
FIG. 7 shows the device according to FIG. 1 in a fourth position in a top view.
Figure 8:
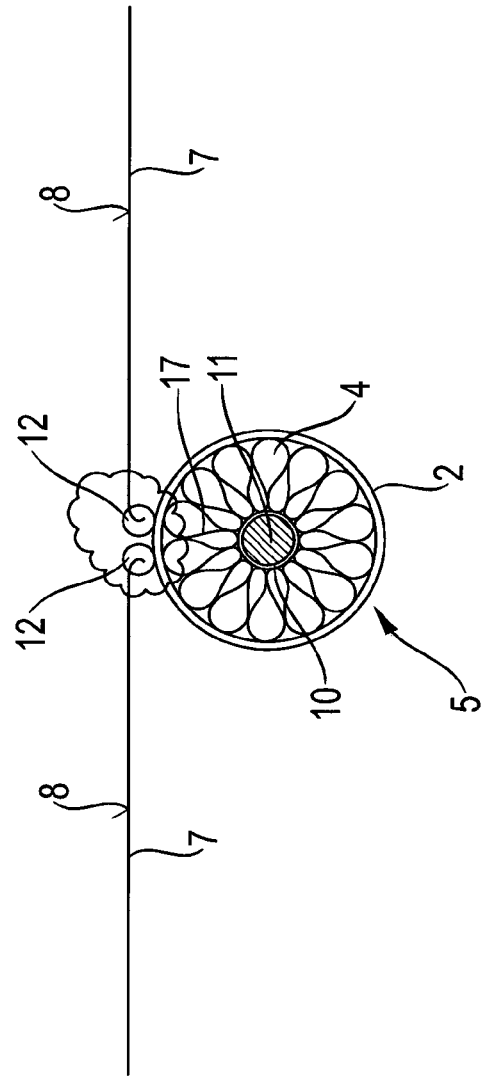
FIG. 8 shows the device according to FIG. 7 with an insulation layer and a flexible cladding material in a side view.

At least one of the two supporting elements 7 of the carrier 6 is moved from the first position according to FIG. 1 into the second position in which the gap 9 reaches its maximum width thereby passing a position shown in FIG. 4. While the gap 9 is widened which means that the supporting elements 7 are moved in the direction of the arrows 13 the insulation layer 4 is lowered together with the layer 2 of the flexible cladding material. The layer 2 of the flexible cladding material is thereby pressed against the outer surface 14 of the insulation layer 4, partly by the rollers 12. To connect the layer 2 of the flexible cladding material to the outer surface 14 of the insulation layer 4 the layer 2 of the flexible cladding material is either adhesive itself or is equipped with an adhesive which for example can be exposed by removing of foil which covers the surface 3 of the layer 2 of the flexible cladding material before the insulation layer 4 is applied to the layer 2 of the flexible cladding material.

The insulation layer 4 is lowered together with the layer 2 of the flexible cladding material into an area at least partly below the carrier 6 after receiving the maximum distance of the supporting elements 7 which is equal to the diameter of the insulation layer 4 plus the layer 2 of the flexible cladding material. The supporting elements 7 are moved back into the first position according to FIG. 1 and shown in FIG. 8 thereby bringing two areas of the layer 2 of the flexible cladding material surrounding the insulation layer 4 into an adjacent position to each other which means that the whole outer surface 14 of the insulation layer 4 is covered with and connected to the layer 2 of the flexible cladding material.

Figure 9:
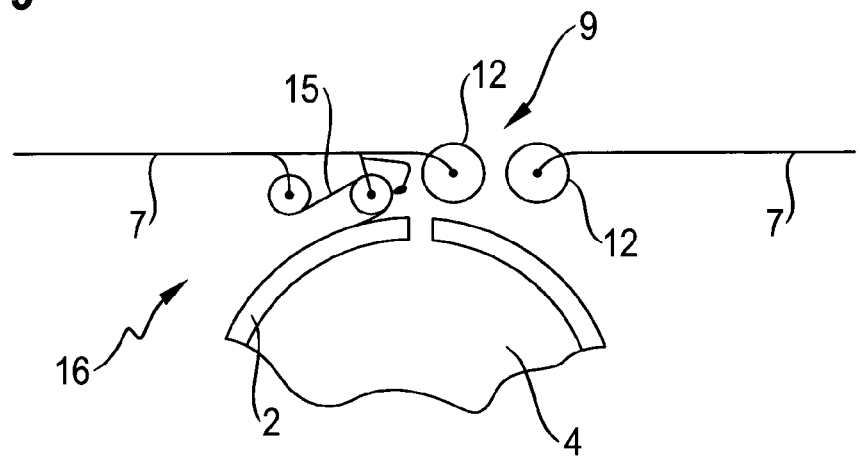
FIG. 9 shows a detailed side view of a device for connecting two ends of a layer of flexible cladding material in a first position.
Figure 10:
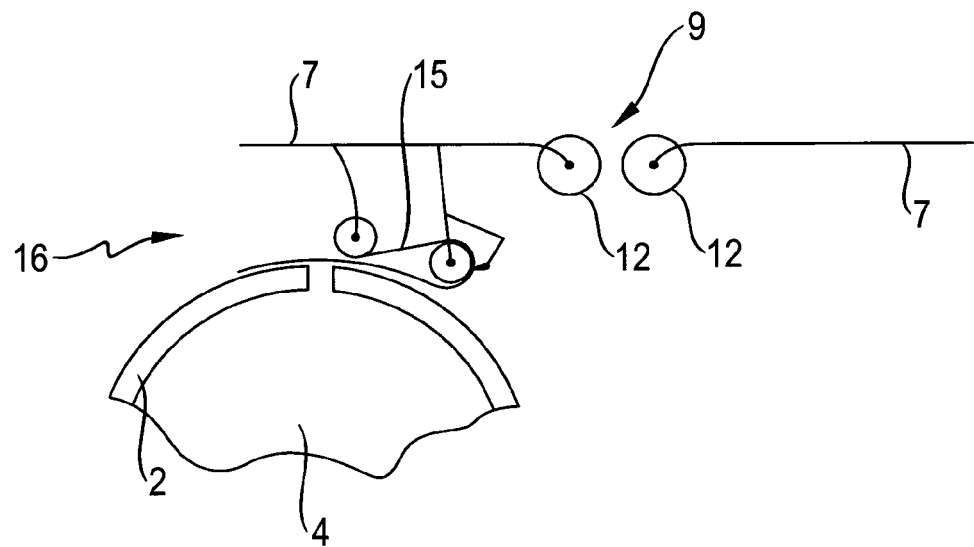
FIG. 10 shows the device according to FIG. 9 in a second position.

The two areas of the layer 2 of the flexible cladding material being in an adjacent position to each other are connected by using a strip of an adhesive tape 15. This may be achieved by using a device 16 shown in more detail in FIGS. 9 and 10. Starting from FIG. 9 it can be seen that the adhesive tape 15 is attached to the adjacent areas of the layer 2 of the flexible cladding material in that the pipe section 5 is moved relatively to the carrier 6 for example by rotating the pipe section 5 or by moving the pipe section 5 parallel to the supporting elements 7 so that the tape is fixed on both areas of the layer 2 of the flexible cladding material.

The layer 2 of the flexible cladding material is provided with a covering (not shown) which protects the layer 2 of the flexible cladding material attached to the insulation layer 4 against mechanical influences. It might also protect the layer 2 of flexible cladding material against UV light in which case it is removed before is pipe section 5 is put into the curing station in which UV light sources are installed emitting UV light to harden the layer 2 of the flexible cladding material which keeps after hardening its shape so that the pipe section 5 is only elastic in a limited value.

On the other hand such covering can be removed in situ which means on the construction area where the pipe section 5 has to be fixed to a pipework. Because of the not hardened layer 2 of the flexible cladding material and the flexible insulation layer 4 the pipe section 5 can be easily imposed on the pipework before the covering is removed and the layer 2 of the flexible cladding material is hardened by natural sunlight or by using one or more artificial UV light sources.

In another embodiment the outer covering is penetrable for UV-light and it can therefore stay on the layer 2 of the flexible cladding material until after curing by UV-light.

The final pipe section 5 consists of the insulation layer 4 and the layer 2 of the flexible cladding material which is connected to the insulation layer 4 directly whereby the layer 2 of the flexible cladding material has a circumferential length being exactly the circumferential length of the outer surface 14 of the insulation layer 4. The layer 2 of the flexible cladding material is fixed to the outer surface 14 of the insulation layer 4 by an adhesive which might be the layer 2 of the flexible cladding material itself or a separate adhesive that may be activated by heat. The insulation layer 4 is interrupted by a slit 17 arranged radially and forming two ends of the insulation layer 4 being arranged adjacent to each other. The slit 17 is provided in the area, where the two ends of the layer 2 of the flexible cladding material are adjacent to each other so that the gap between the two ends of the layer 2 of the flexible cladding material is smaller than e.g. 20 mm. The slit 17 allows to open the pipe section 5 in this area to impose the pipe section 5 on the pipework. The slit 17 is preferably produced in a final step of the production of the pipe section 5.

Figure 11:
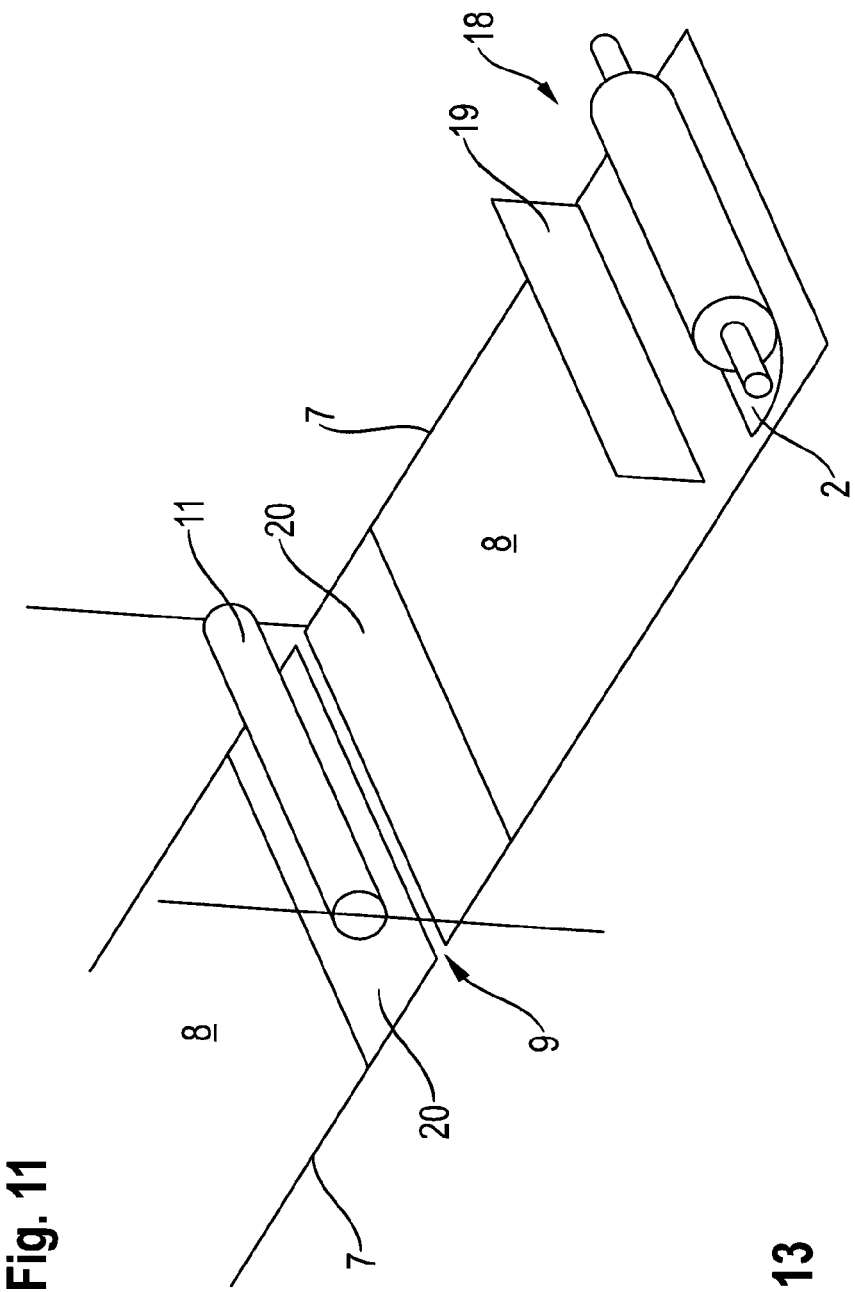
FIG. 11 shows a second embodiment of a device for processing the method according the disclosure in a perspective view.
Figure 12:
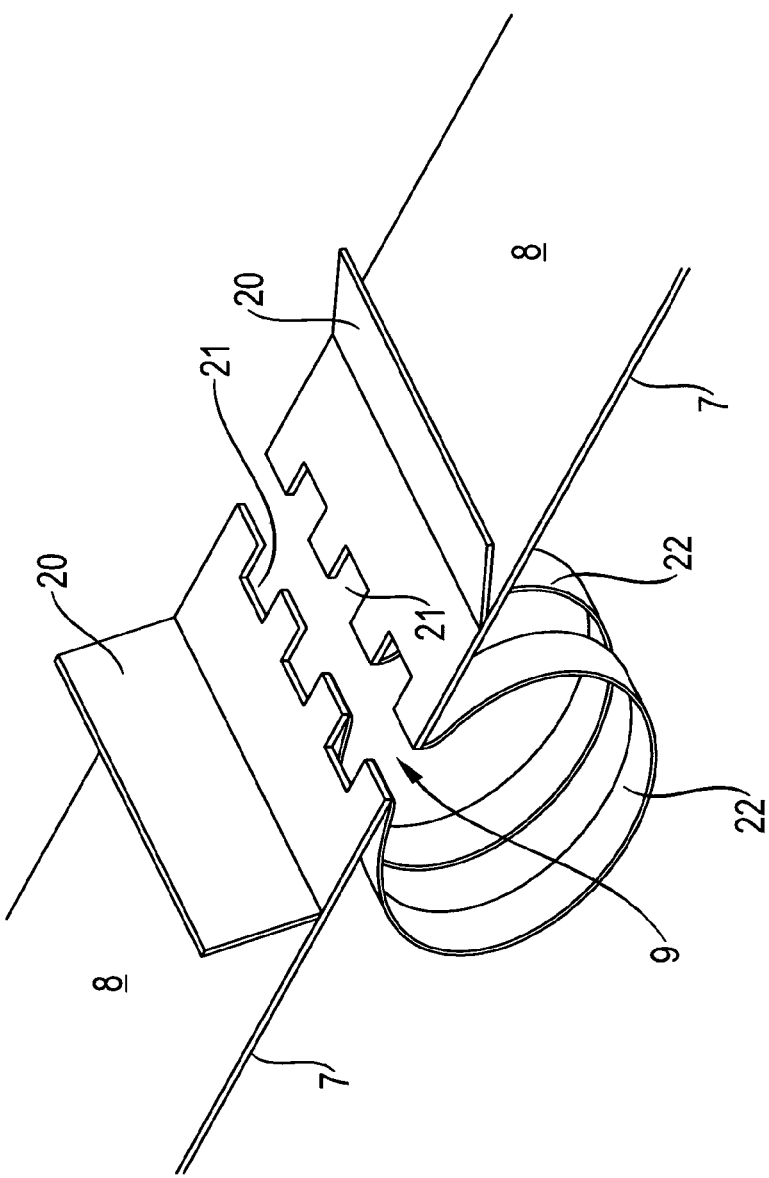

FIG. 11 and FIG. 12 show a further embodiment of the device 1 having an additional storage area 18 for the layer 2 of the flexible cladding material which is stored in rolled shape. Furthermore, this embodiment shows a cutting device 19 being provided between the storage area 18 and the gap 9 between the two supporting elements 7.

In the area of the two ends of the supporting elements 7 defining the gap 9 the carrier 6 is provided with two board-like elements 20 being pivotable attached to the upper surface 8 of the carrier 6 and covering a plurality of recesses 21 at the ends of the supporting elements 7. The board-like elements 20 can be pivoted with respect to the upper surface 8 of the carrier 6 thereby uncovering the recesses 21 which provide access to attaching an adhesive tape 15 manually to the outer surface 3 of the layer 2 of the flexible cladding material at the finishing step of the process. According to FIG. 12 a plurality of belts 22 are connected to the two ends of the supporting elements 7. The insulation layer 4 can be disposed on top of the belts 22 in a position of the carrier 6 in which the two supporting elements 7 are positioned in their maximum distance to each other thereby disposing the belts 22 in an elongated position. By closing the gap 9 between the two supporting elements 7 the insulation layer 4 is lowered together with the layer 2 of the flexible cladding material whereby the belts 22 are pressing the layer 2 of the flexible cladding material against the outer surface 14 of the insulation layer 4 until the gap 9 between the two supporting elements 9 are nearly closed leaving the recesses open to attach the adhesive tape 15 to the outer surface 3 of the layer 2 of the flexible cladding material in order to hold the ends of the layer 2 of the flexible cladding material together.

Figure 13:
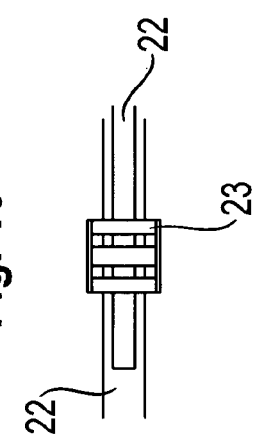
FIG. 12 shows a part of the device according to FIG. 11 in a detailed perspective view and FIG. 13 shows a connection of two ends of a belt in connection with the device according FIGS. 11 and 12.

The belts 22 can be adjusted in their length by using a device 23 comparable to a luggage strap as shown in FIG. 13. Adjustable belts 22 have the advantage that the device 1 according to FIGS. 11 and 12 can be used for the production of pipe sections 5 having different diameters. Furthermore, it has to be pointed out that using a device 1 according to FIGS. 11 and 12 may have the advantage that a core 11 is not needed, since the guidance of the insulation layer 4 and the layer 2 of the flexible cladding material is achieved by the belts 22.

Using the device 1 according to the FIGS. 11 and 12 for the production of pipe sections 5 follows the steps of arranging part of the stored layer 2 of the flexible cladding material on top of the carrier 6, cutting the layer 2 of the flexible cladding material in a length approximately equal to the circumference of the insulation layer 4, applying the insulation layer 4 on the layer 2 of the flexible cladding material being disposed on the expanded belts 22, closing the gap 9 between the supporting elements 7 thereby lowering the insulation layer 4 and the layer 2 of the flexible cladding material which is pressed against and connected to the outer surface 14 of the insulation layer 4 by the belts 22, opening the board-like elements 20 to make the recesses 21 accessible, fixing adhesive tape 15 to the outer surface 3 of the layer 2 of the flexible cladding material to connect the two ends of the layer 2 of the flexible cladding material, removing the pipe section 5 from the device 1 and curing the layer 2 of the flexible cladding material in a curing device by using artificial UV-light or in situ by using sunlight.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for applying a flexible cladding material to an outer surface of an insulation layer for a pipe section comprising the following steps:
   providing the insulation layer in the shape of a cylinder having a cylindrical central opening,
   providing a first and a second supporting element defining a gap between the first and second supporting element, of which at least the first element is movable towards and away from the second supporting element between a first position in which the two supporting elements are close to each other, thereby nearly closing the gap and a second position in which the supporting elements are at a distance from each other, thereby defining the gap being larger than the gap in the first position,
   arranging a layer of the flexible cladding material between the insulation layer and the two supporting elements in such manner that an adhesive surface of the layer of flexible cladding material is facing towards the insulation layer, or in such a manner that an adhesive surface of the insulation layer is facing towards the layer of flexible cladding material,
   moving the insulation layer and the supporting elements in relation to each other in such manner that the insulation layer and at least a part of the layer of the flexible cladding material is moved through the gap between the first and the second supporting element,
   whereby the two supporting elements are moved towards each other after the insulation layer and the layer of the flexible cladding material with its major diameter has passed through the gap between the first and the second supporting element and
   wherein the flexible cladding material is adhesively connected to the insulation layer during or after the mentioned process steps.

2. The method according to claim 1, wherein,
   the layer of the flexible cladding material is arranged on a carrier having the two supporting elements being relatively movable in a horizontal plane to each other;
   the insulation layer being arranged on the layer of the flexible cladding material above the gap between the two supporting elements of the carrier;
   wherein at least one of the two supporting elements of the carrier is moved from the first position into the second position, thereby widening the gap;
   wherein the insulation layer together with the layer of the flexible cladding material is lowered into an area at least partly below the carrier;
   wherein at least one of the two supporting elements of the carrier is moved from the second position to the first position thereby bringing two areas of the layer of the flexible cladding material surrounding the insulation layer into an adjacent position to each other and
   wherein the two areas of the layer of the flexible cladding material are connected to each other.

3. The method according to claim 1, wherein,
   the layer of the flexible cladding material is arranged on a carrier having the two supporting elements being relatively movable in a horizontal plane to each other;
   the insulation layer being arranged on the layer of the flexible cladding material above the gap between the two supporting elements of the carrier;
   wherein the insulation layer together with the layer of the flexible cladding material is lowered through the gap into an area at least partly below the carrier;
   wherein at least one of the two supporting elements of the carrier is moved, thereby closing the gap and bringing two areas of the layer of the flexible cladding material into an adjacent position to each other, surrounding the insulation layer and
   wherein the two areas of the layer of the flexible cladding material are connected to each other.

4. The method according to claim 1,
   wherein,
   at least one surface of the layer of the flexible cladding material is provided with a covering that is removed to expose an adhesive surface before positioning the insulation layer on the adhesive surface of the layer of the flexible cladding material.

5. The method according to claim 1,
   wherein,
   the supporting elements are moved in such manner that they each exerts a pressure on the flexible cladding material towards the insulation layer.

6. The method according to claim 1,
   wherein,
   the two adjacent areas of the layer of the flexible cladding material are connected to each other by using at least one adhesive tape.

7. The method according to claim 1,
   wherein,
   the layer of the flexible cladding material is a UV light curable fiberglass reinforced polyester mat that after application on the insulation layer is cured in a curing station by using at least one light source emitting UV light.

8. The method according to claim 1,
   wherein,
   a core is inserted into the central cylindrical opening of the insulation layer before positioning the insulation layer in the area of the supporting elements.

9. The method according to claim 6,
   wherein,
   the insulation layer is turned around its middle axis before connecting the two areas of the layer of the flexible cladding material being adjacent to each other.

10. The method according to claim 1,
wherein,
the first and second supporting elements are moved simultaneously and equally.

11. The method according to claim 1,
wherein,
the insulation layer is interrupted by a slit being arranged radially forming two ends of the insulation layer being arranged adjacent to each other and wherein the layer of the flexible cladding material is fixed to the insulation layer leaving one end of the insulation layer free of and therefore not covered by the layer of the flexible cladding material.

12. The method according to claim 11,
wherein,
the insulation layer is elastified in the area of the one end not covered by the layer of the flexible cladding material.

13. A pipe section for heat insulation consisting of an insulation layer having an outer surface and an outer cladding made of a layer of a flexible fiberglass reinforced polyester mat, produced according to the method according to claim 1,
wherein,
the layer of the flexible cladding material has a circumferential length being exactly a circumferential length of the outer surface of the insulation layer or up to a maximum of 5% shorter of the circumferential length of the outer surface of the insulation layer and wherein the layer of the flexible cladding material is directly fixed on an outer surface of the insulation layer.

14. The pipe section according to claim 13,
wherein,
the layer of the flexible cladding material is fixed to the outer surface of the insulation layer via an adhesive being part of the layer of the flexible cladding material.

15. The pipe section according to claim 14,
wherein,
the layer of the flexible cladding material has been cured by UV-light.

16. The pipe section according to claim 13,
wherein,
the insulation layer has an outer cylindrical diameter between 500 mm and 1.200 mm.

17. The pipe section according to claim 13,
wherein,
the insulation layer is interrupted by a slit being arranged radially forming two ends of the insulation layer being arranged adjacent to each other and wherein the layer of the flexible cladding material is fixed to the insulation layer leaving one end of the insulation layer free of and therefore not covered by the layer of the flexible cladding material.

18. The insulation element according to claim 13,
wherein,
the insulation layer is elastified in an area of one end not covered by the layer of the flexible cladding material.

* * * * *